United States Patent
Vasseur et al.

(10) Patent No.: US 10,680,889 B2
(45) Date of Patent: Jun. 9, 2020

(54) NETWORK CONFIGURATION CHANGE ANALYSIS USING MACHINE LEARNING

(71) Applicant: Cisco Technology, Inc., San Jose, CA (US)

(72) Inventors: Jean-Philippe Vasseur, Saint Martin d'uriage (FR); Vinay Kumar Kolar, San Jose, CA (US); Santosh Ghanshyam Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 15/942,665

(22) Filed: Apr. 2, 2018

(65) Prior Publication Data

US 2019/0306023 A1 Oct. 3, 2019

(51) Int. Cl.
| | |
|---|---|
| *H04L 12/24* | (2006.01) |
| *H04L 12/26* | (2006.01) |
| *G06N 5/04* | (2006.01) |
| *G06N 20/00* | (2019.01) |

(52) U.S. Cl.
CPC .......... *H04L 41/0816* (2013.01); *G06N 5/04* (2013.01); *G06N 20/00* (2019.01); *H04L 41/082* (2013.01); *H04L 41/147* (2013.01); *H04L 43/50* (2013.01)

(58) Field of Classification Search
CPC ... H04L 41/0816; H04L 41/082; H04L 43/50; H04L 43/10; H04L 43/0876; G06N 20/00; G06N 5/04
See application file for complete search history.

(56) References Cited

U.S. PATENT DOCUMENTS

| | | | |
|---|---|---|---|
| 2004/0236547 A1* | 11/2004 | Rappaport | ............ G06F 17/509 703/2 |
| 2014/0351176 A1 | 11/2014 | Jan et al. | |
| 2015/0381409 A1 | 12/2015 | Margalit et al. | |
| 2016/0212031 A1* | 7/2016 | Jain | ..................... H04L 43/0876 |

(Continued)

OTHER PUBLICATIONS

Deshpande, et al., "Filer Response Time Prediction using Adaptively-learned Forecasting Models based on Counter Time Series Data", 2016 15th IEEE International Conference on Machine Learning and Applications, 6 pages, 2016, IEEE.

(Continued)

*Primary Examiner* — Shukri Taha

(74) *Attorney, Agent, or Firm* — Behmke Innovation Group LLC; James M. Behmke; Jonathon P. Western

(57) ABSTRACT

In one embodiment, a network assurance service that monitors one or more networks receives data indicative of networking device configuration changes in the one or more networks. The service also receives one or more performance indicators for the one or more networks. The service trains a machine learning model based on the received data indicative of the networking device configuration changes and on the received one or more performance indicators for the one or more networks. The service predicts, using the machine learning model, a change in the one or more performance indicators that would result from a particular networking device configuration change. The service causes the particular networking device configuration change to be made in the network based on the predicted one or more performance indicators.

18 Claims, 10 Drawing Sheets

(56) References Cited

U.S. PATENT DOCUMENTS

| | | |
|---|---|---|
| 2016/0314056 A1 | 10/2016 | Greene et al. |
| 2017/0279839 A1 | 9/2017 | Vasseur et al. |
| 2017/0302505 A1 | 10/2017 | Zafer et al. |
| 2017/0302553 A1* | 10/2017 | Zafer .................. H04L 41/142 |
| 2019/0026206 A1* | 1/2019 | Harutyunyan ...... G06F 11/3006 |
| 2019/0089617 A1* | 3/2019 | Raney .................... H04L 43/12 |

OTHER PUBLICATIONS

Gelman, et al., "Causal inference using regression on the treatment variable", Chapter 9, Data Analysis Using Regression and Multilevel/Hierarchical Model, 32 pages, 2006, Cambridge University Press.

Lopez, et al., "Estimation of causal effects with multiple treatments: a review and new ideas", arXiv:1701.05132v2, Jan. 19, 2017, 37 pages, arXiv.org.

Mahimkar, et al., "Detecting the Performance Impact of Upgrades in Large Operational Networks", SIGCOMM'10, Aug. 30-Sep. 3, 2010, New Delhi, India., 12 pages, 2010, ACM.

Mahimkar, et al., "Robust Assessment of Changes in Cellular Networks", CoNEXT'13, Dec. 9-12, 2013, Santa Barbara, California, USA., 12 pages, 2013, ACM.

Stuart, Elizabeth A., "Matching methods for causal inference: A review and a look forward" Statistical science: a review journal of the Institute of Mathematical Statistics 25, No. 1, 29 pages, 2010, doi:10.1214/09-STS313.

\* cited by examiner

NETWORK CONFIGURATION CHANGE ANALYSIS USING MACHINE LEARNING

TECHNICAL FIELD

The present disclosure relates generally to computer networks, and, more particularly, to network configuration change analysis using machine learning.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
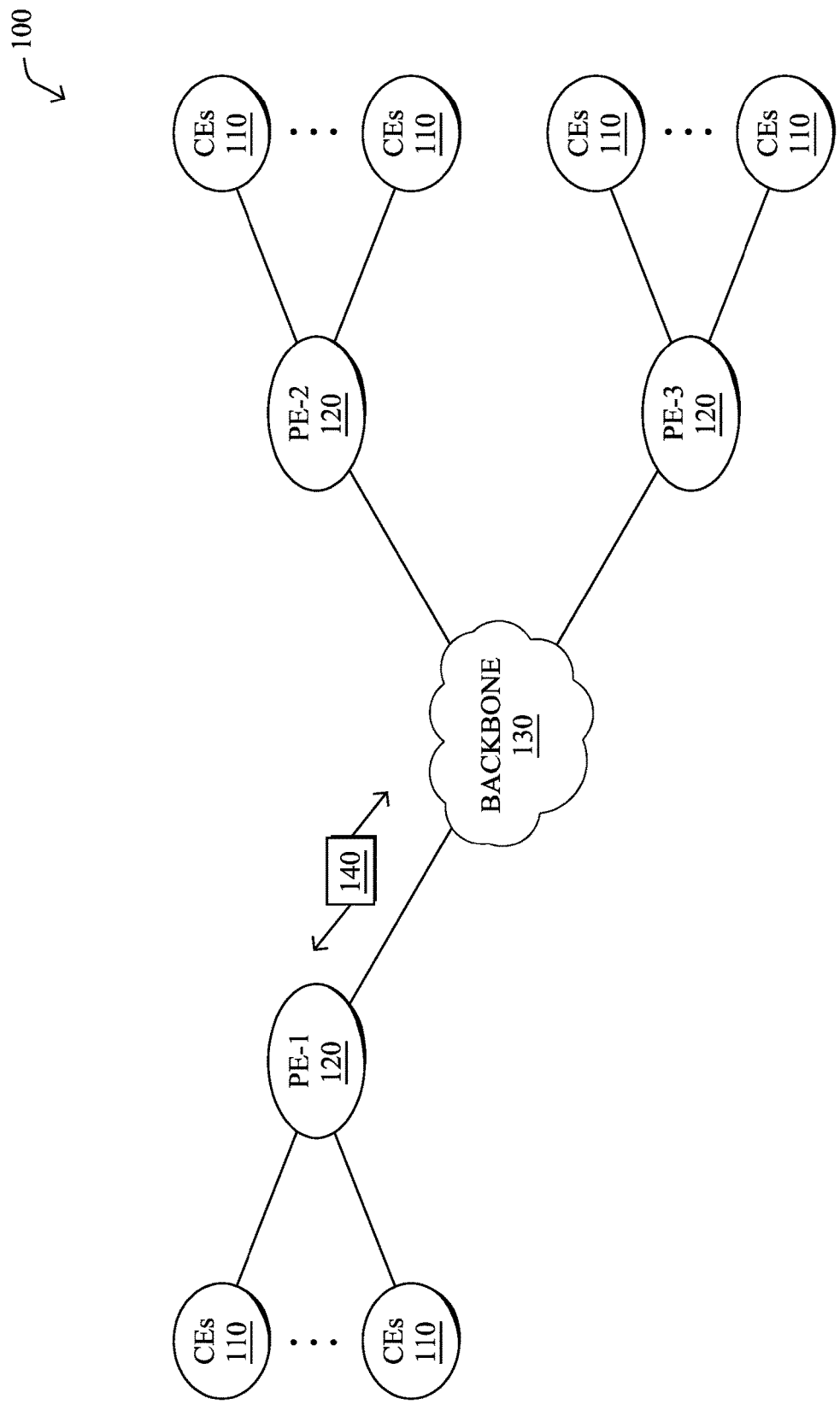
FIGS. 1A-1B illustrate an example communication network.

According to one or more embodiments of the disclosure, a network assurance service that monitors one or more networks receives data indicative of networking device configuration changes in the one or more networks. The service also receives one or more performance indicators for the one or more networks. The service trains a machine learning model based on the received data indicative of the networking device configuration changes and on the received one or more performance indicators for the one or more networks. The service predicts, using the machine learning model, a change in the one or more performance indicators that would result from a particular networking device configuration change. The service causes the particular networking device configuration change to be made in the network based on the predicted one or more performance indicators.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
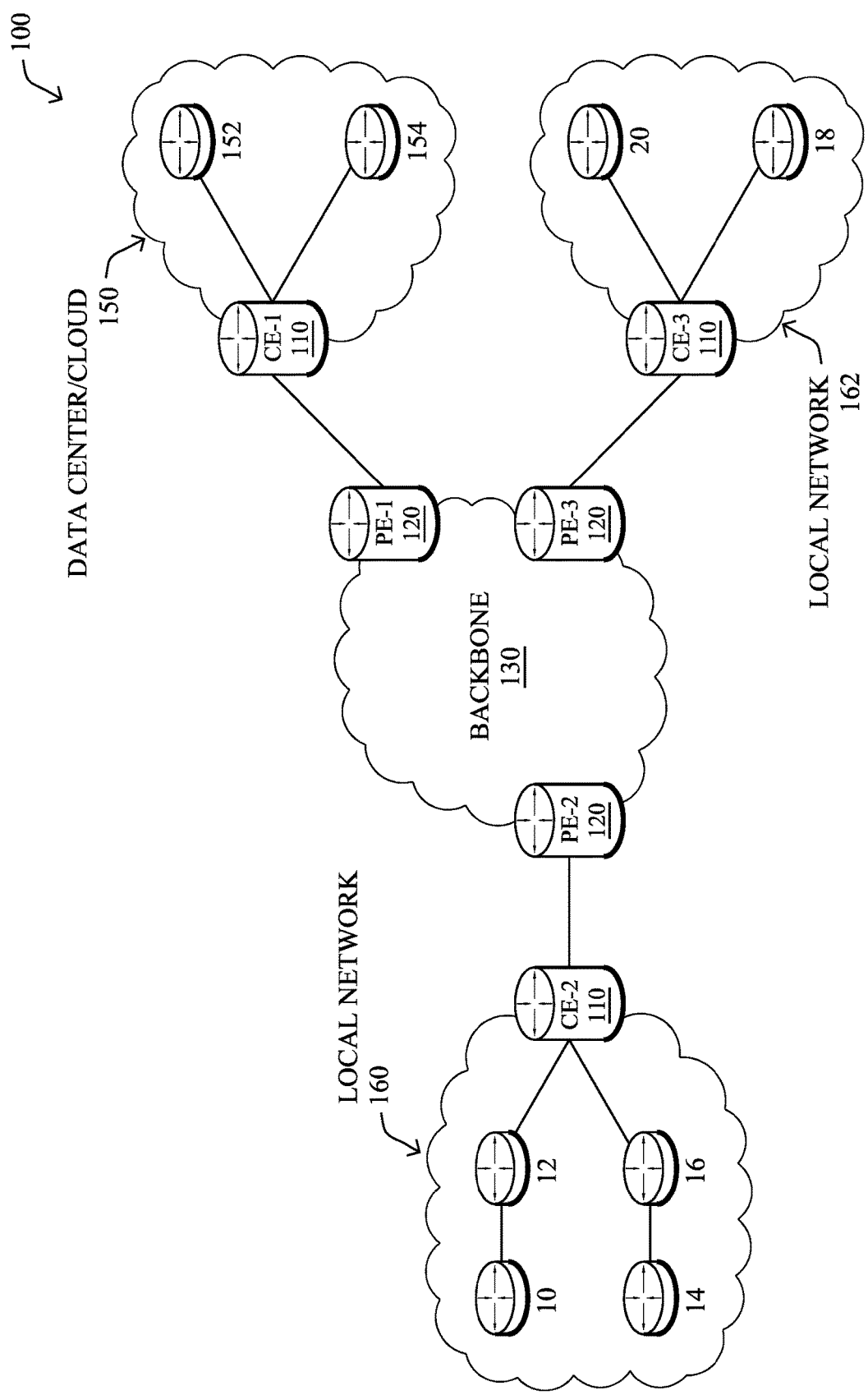

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather is the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
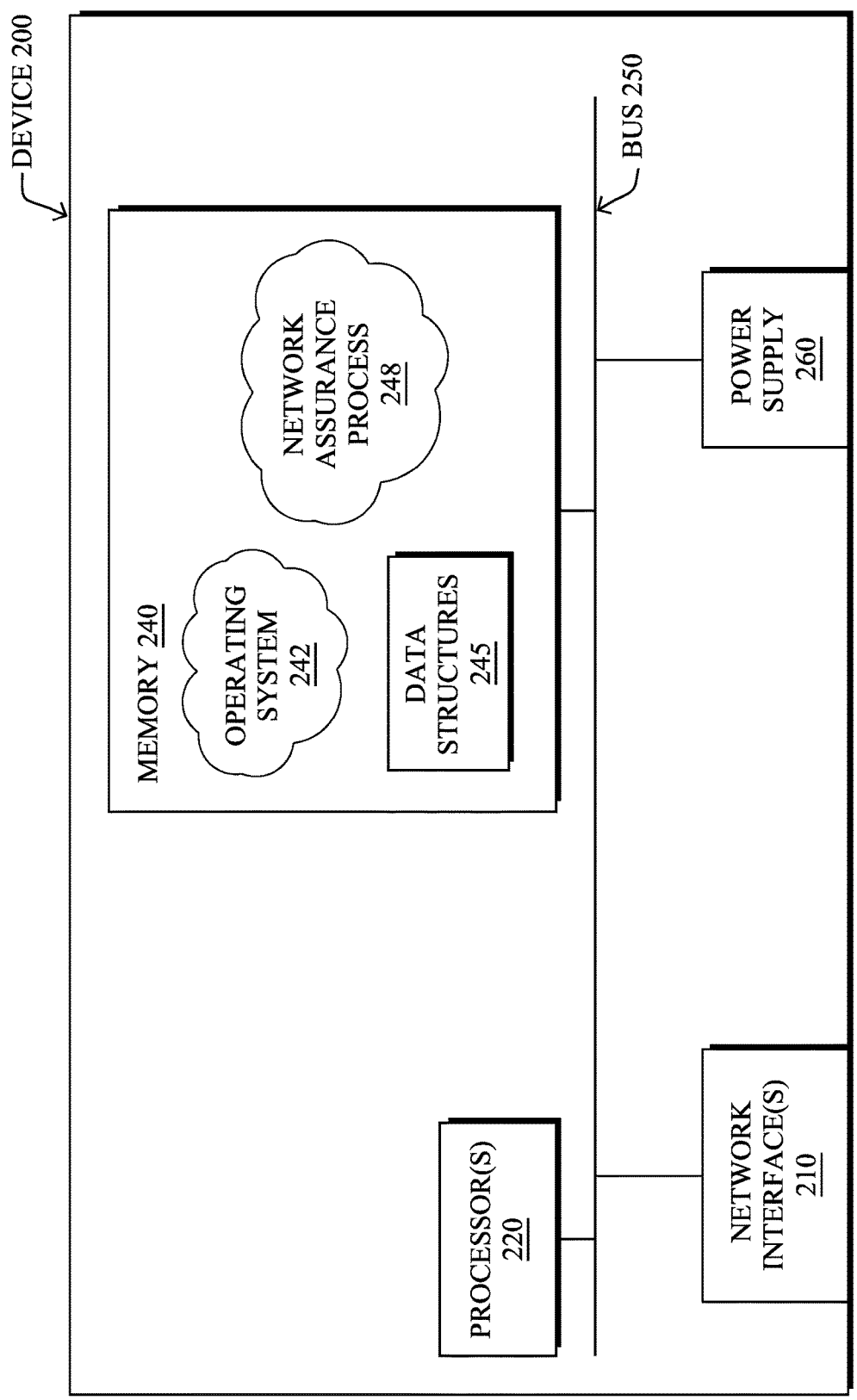
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
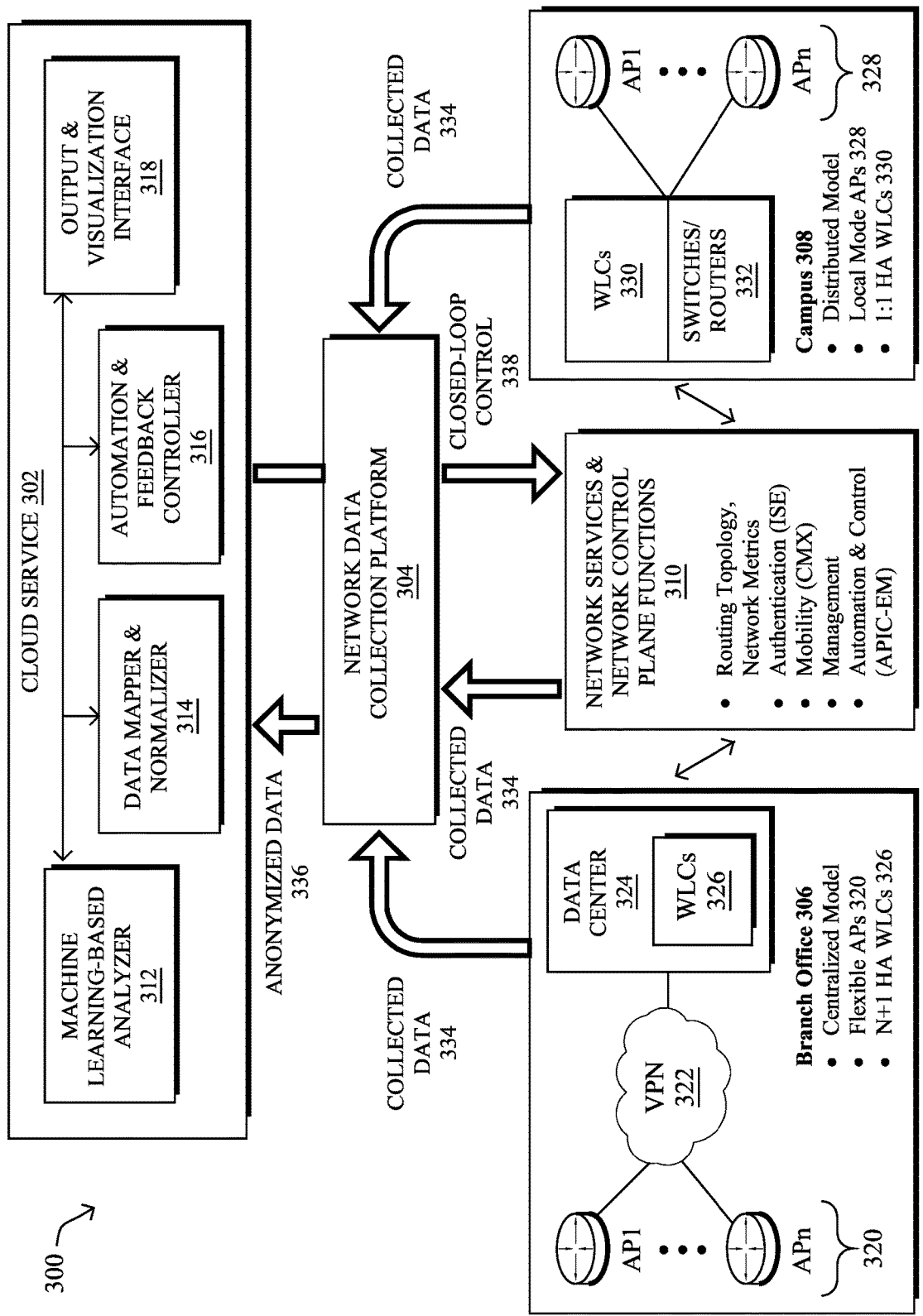
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, large computer networks include any number of networking devices, such as routers, wireless APs, WLCs, and the like. Managing multiple such devices in a complex network often requires updating the device configurations (e.g., the software version of a given device, etc.), to ensure that the network is up-to-date and not vulnerable to attacks. This is more so true in today's paradigm of agile development where developers constantly provide enhanced features and bug-fixes.

Configuration changes to networking devices, particularly those involving software updates, are prone to introducing unexpected device behaviors into the network and sometimes even leading to catastrophic device or network failure. However, identifying such behavioral changes and their impact on the network are very challenging. First, the configuration change may react differently at different types of devices. For example, some device models may be prone to catastrophic failures, while others may be immune. Second, there are often an exponentially large number of different combinations of configurations which cannot be possibly tested due to the combinatorial number of options. For example, consider a very simple configuration with three features, each having two values (e.g., 'true' or 'false'). This leads to $2^3=8$ possible scenarios. Today's networks often have hundreds of features, leading to an ever-growing set of possible scenarios. Consequently, exhaustive testing for each scenario is typically not feasible, thus exposing deployment networks to possible catastrophic failures during configuration changes. Further, the traffic conditions themselves may dramatically affect the overall behavior of a network, meaning that identical networking device configurations in different networks can still result in different network behaviors.

Some network assurance systems do not detect performance degradation automatically, but instead rely on users submitting bug reports, to report problems. As would be appreciated, these types of systems are prone to human error and lead to a delay between when the phenomenon occurs and the bug is reported. Other assurance systems may be more data-driven, but focus on the individual device, to determine whether the performance of the device has degraded. However, this approach also lack the notions of device similarity (e.g., similar devices that are associated with different performance indicators) and fail to consider other potential causes for performance degradation. For example, assume that a networking device configuration change is made to a network at a school, just prior to the start of classes. Any performance degradation that may occur is not necessarily caused by this configuration change, but could also be attributed to the large jump in network traffic due to the influx of students.

Network Configuration Change Analysis Using Machine Learning

The techniques herein introduce a machine learning approach to (a) identify performance degradation in a monitored network, both before and after the deployment of configuration changes, and (b) perform root cause analysis on any detected degradation, to ascertain whether a configuration change caused the performance degradation.

Specifically, according to one or more embodiments of the disclosure as described in detail below, a network assurance service that monitors one or more networks receives data indicative of networking device configuration changes in the one or more networks. The service also receives one or more performance indicators for the one or more networks. The service trains a machine learning model based on the received data indicative of the networking device configuration changes and on the received one or more performance indicators for the one or more networks. The service predicts, using the machine learning model, a change in the one or more performance indicators that would result from a particular networking device configuration change. The service causes the particular networking device configuration change to be made in the network based on the predicted one or more performance indicators.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4A:
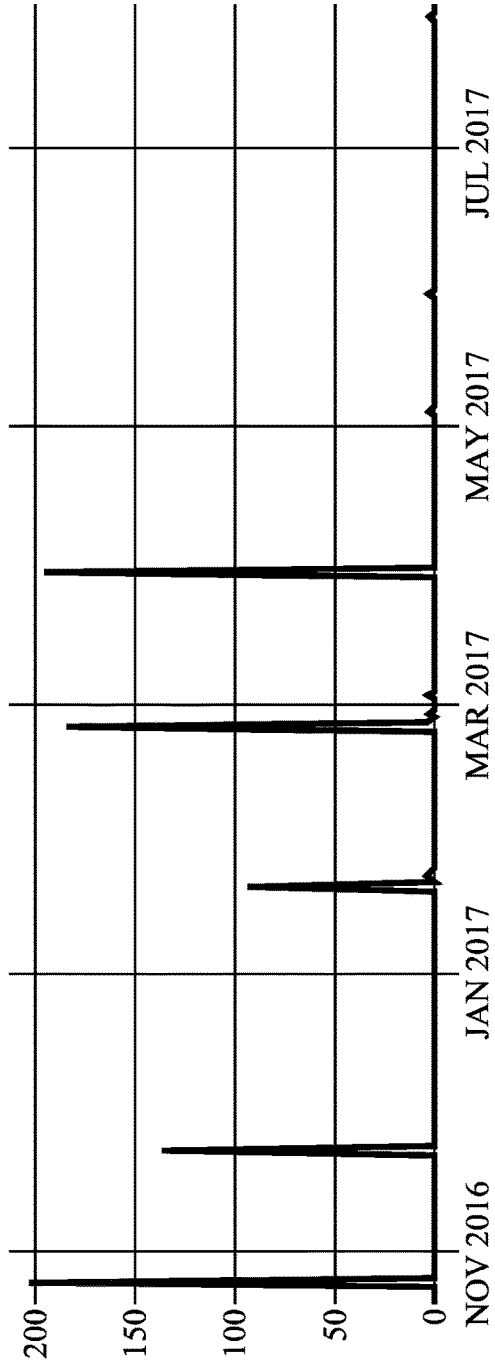
FIGS. 4A-4C illustrate plots of the effects of network configuration changes over time.
Figure 4B:
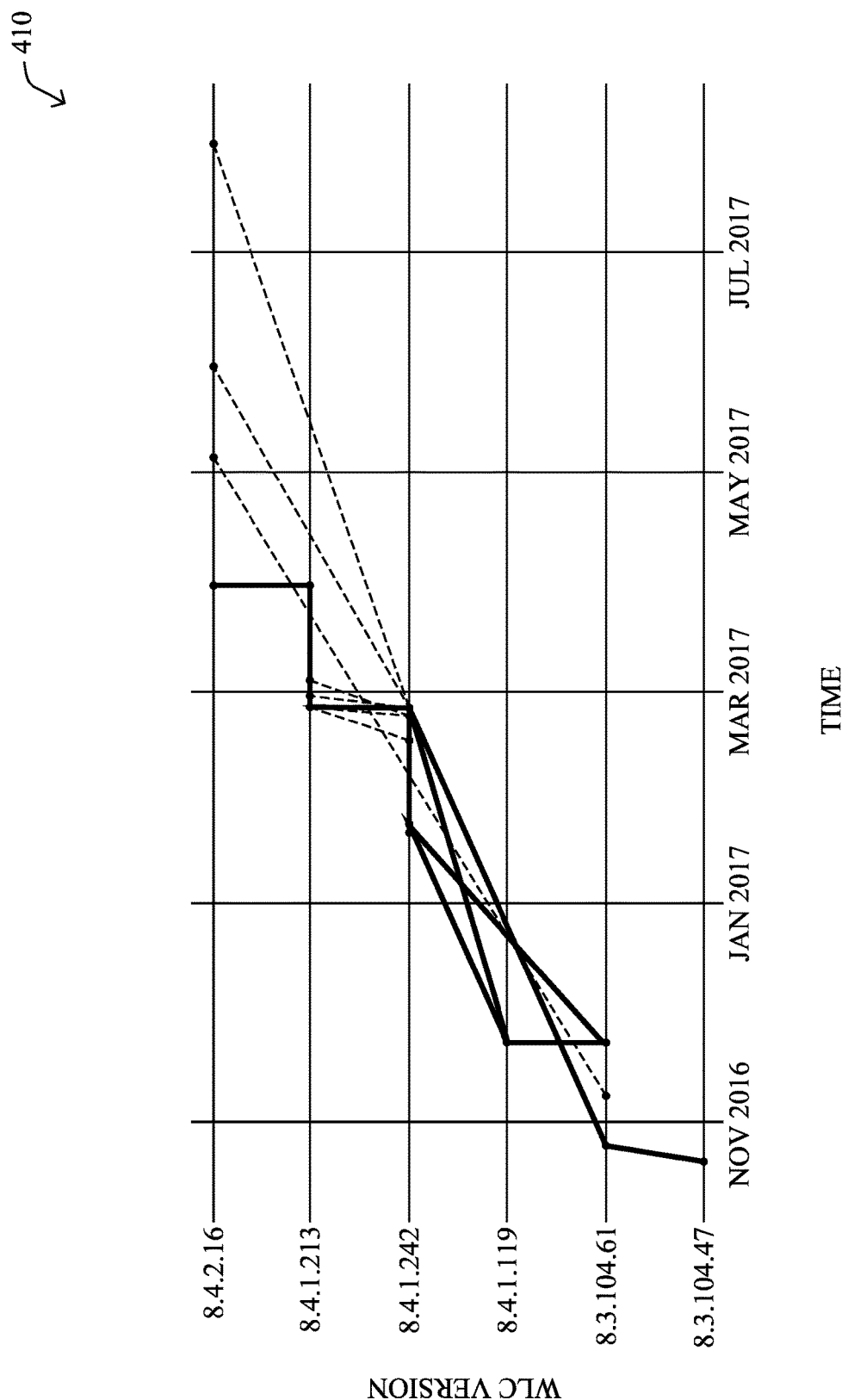
Figure 4C:
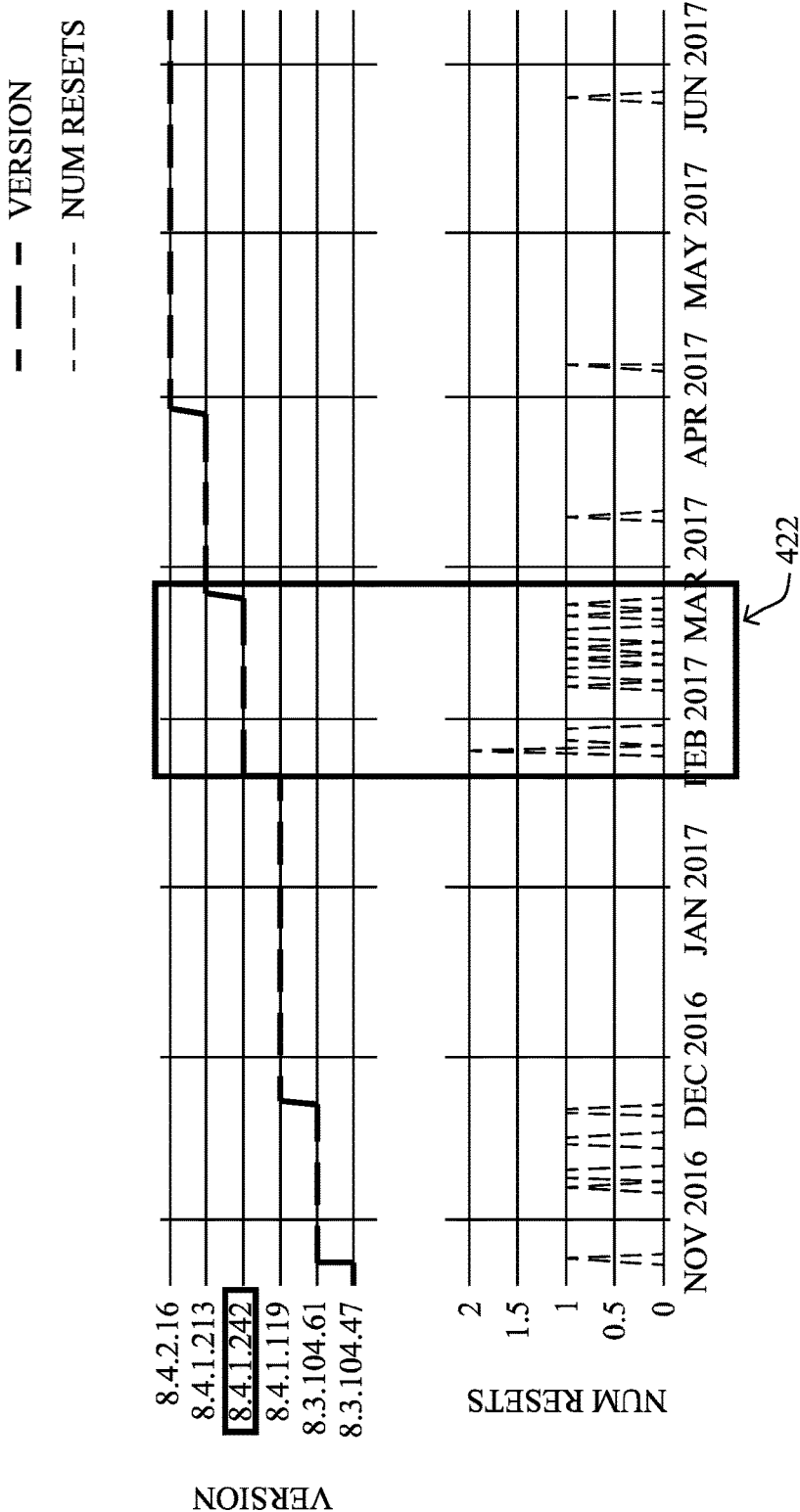

Operationally, FIGS. 4A-4C illustrate plots of the effects of network configuration changes over time, in various embodiments. Plot 400 in FIG. 4A illustrates a timeline of radio configuration changes (e.g., for wireless APs) on the x-axis. The y-axis denotes the number of radios to which the configuration changes were applied. From this, it can be seen that network administrators often deploy configuration changes to large numbers of networking devices at once. However, monitoring all radios for each type of configuration change is hard. For example, when a particular WLC software version was applied to a test network, very few radios, approximately 2%, experienced adverse effects (e.g., radio failures) to happen often. This is shown in even greater detail in plot 410 in FIG. 4B, which depicts the various software updates applied in the network, with the line weights corresponding to the number of networking devices that were upgraded.

FIG. 4C illustrates an example plot 420 of the deployment of different software versions over time to a single network radio and the observed number of radio resets that resulted. In the area 422 shown, it can be seen that during one month, software version 8.4.1.242 was deployed and the number of radio resets were significantly higher.

Figure 5:
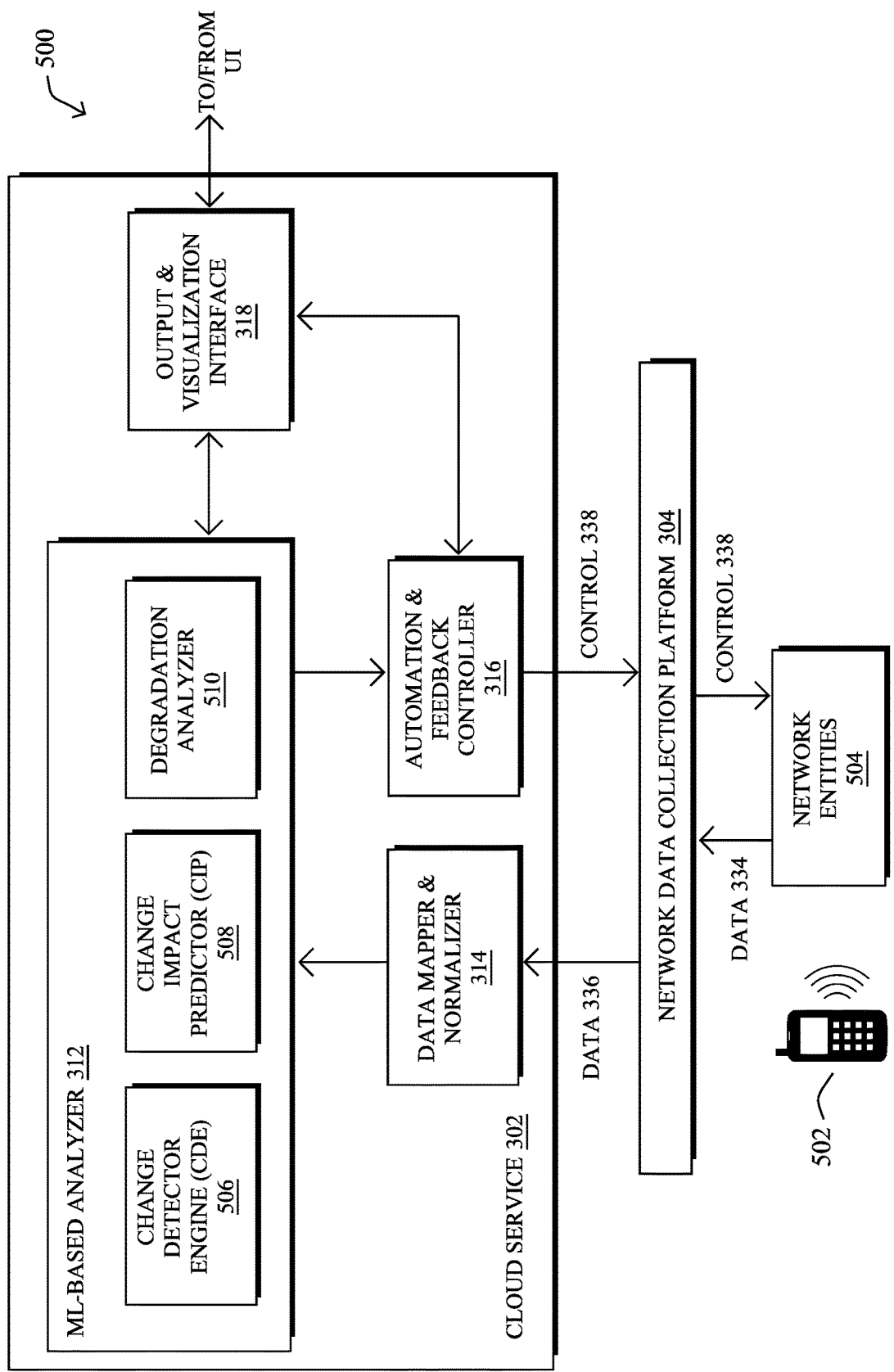
FIG. 5 illustrates an example architecture for analyzing network configuration changes using machine learning.

FIG. 5 illustrates an example architecture 500 for analyzing network configuration changes in a network assurance system, according to various embodiments. At the core of architecture 500 may be the following components: a change detector engine (CDE) 506, a change impact predictor (CIP) 508, and a degradation analyzer 510. In some implementations, the components of architecture 500 may be implemented within a network assurance system, such as system 300 shown in FIG. 3. Accordingly, the components 506-510 of architecture 400 shown may be implemented as part of cloud service 302 (e.g., as part of machine learning-based analyzer 312), as part of network data collection platform 304, and/or on one or more network elements/entities 504 that communicate with one or more client devices 502 within the monitored network itself. Further, these components may be implemented in a distributed manner or implemented as its own stand-alone service, either as part of the local network under observation or as a remote service. In addition, the functionalities of the components of architecture 500 may be combined, omitted, or implemented as part of other processes, as desired.

In various embodiments, CDE 506 may be configured to determine the "state" of the monitored network at a given time, as well as detecting when the state changes. More specifically, CDE 506 may take as input a set of state variables. Such state variables may include, for example, the software versions (e.g., OS release) for the networking devices in the monitored network (e.g., APs, clients, WLCs, etc.) and/or configuration parameters used by the networking devices. For example, a configuration parameter can be represented as a simple dirty bit on subgroup of variables per use case (e.g., among the N variables that can impact use case A, then one of them has been changed). In turn, CDE 506 may aggregate these state variables into a state vector S, which can be denoted, for example, as S=[WLC_OS, AP_OS, $C_1, C_2, \ldots, C_n$], where WLC_OS is the OS release of the WLC, AP_OS is the OS release of the AP, and $C_i$ is the $i^{th}$ configuration bit.

Said differently, CDE 506 may determine the networking device configuration parameters and flag a configuration change and the type of change, when it detects such a change. For example, CDE 506 may monitor the changes to the WLC software version that is continuously emitted by the wireless access point (AP). Once updated, CDE 506 flags the configuration change event for the given AP. In one embodiment, a simple flag may be used (e.g. release number). In another embodiment, CDE 506 may decompose the configuration of the networking device and extract out the features that are enabled on the device. A change event can then be identified when some configuration parameter is altered.

CDE 506 may also be configured to track a series of key performance indicators that may include any or all of the following:

1. Issue-related statistics: number, frequency, and/or uniformity (e.g., presence of bursts) for throughput issues, on-boarding issues, radio reset, etc.
2. Performance-related statistics: throughput per type of device, on-boarding time, interference, packet failure rate, etc.

In one embodiment, CDE 506 may construct the distribution of these performance indicators dependent on the value of a given state of the network (e.g., a combination of OS release and configuration bits). In particular, let P(M|S) denote the distribution of the performance indicator M, say the average on-boarding time, for the state S. Now, if a configuration change is applied to the network, this leads to a new state S' and CDE 506 may construct a new distribution P(M|S').

As the state S changes to S', CDE 506 may compare the distributions P(M|S) and P(M|S'). This can be done in a number of different ways, in various embodiments. In some embodiments, CDE 506 may compare empirical distributions using statistical tests (e.g., using the two-sample Kolmogorov-Smirnov test). P-values can be used to determine if two states S and S' lead to significantly different distributions. In other embodiments, CDE 506 may employ statistical models predict certain moments (e.g., a quantile regressor, etc.) of the distribution P(M|S) by using S as an input vector. In this case, feature relevance can be used to determine if a given entry of S is particularly impactful on the P(M|S). On detecting a state change from S to S' that leads to a deterioration of P(M|S'), CDE 506 may generate and issue an alert to output and visualization interface 318 for display by a user interface (UI). Such an alert may also indicate a proposed action, such as to revert the configuration change or deploy a different configuration change to the network.

Architecture 500 may also include CIP 508 that is configured to predict the impact of a configuration change on one or more of the performance indicators. For example, CIP 508 may offer an interactive application program interface (API) via output and visualization interface 318 that allows the user of the UI to evaluate the impact of a proposed configuration change on a given performance indicator. To make such predictions, CIP 508 may leverage the models or distributions of CDE 506 to simulate a change from state S to the state S' that would result from enacting the proposed configuration change. From such a simulation, CIP 508 may determine whether the proposed change would be detrimental to the performance indicator(s). Note that CIP 508 may require, in some cases, data from a plurality of monitored networks, so that more information can be collected by the service about the different possible states. This is especially true for release-related changes, which require some early adopters to experiment with the new release, in order to allow accurate models to be built.

In another embodiment, CIP 508 may evaluate various "popular" changes S→S', S→S", etc. in order to suggest improvements to the customer. For instance, it may propose an upgrade to a new AP release to a given customer by letting him know that they could have 20% less throughput issues because they are running an older release.

Architecture 500 may also include a degradation analyzer 510 which is configured to determine whether there was any performance degradation of the networking device (or in the network) after the configuration changes were applied. In one embodiment, degradation analyzer 510 first analyzes the performance before the change event was detected. Two possible detection approaches are possible. In one approach, degradation analyzer 510 may compare the distribution of the performance indicators pre- and post-change event. For example, degradation analyzer 510 may analyze the following performance indicators: number of radio resets (radio failures), device throughput, device association failures, and the like, before and after the WLC software version was changed.

Degradation analyzer 510 may then run one or more distribution tests to determine whether: (1) the distribution of post-change is much different than that of pre-change, and (2) the post-change distribution is significantly "worst" than the pre-change distribution. Based on the type of distributions observed, degradation analyzer 510 may apply the Kolmogorov-Smirnoff Two Sample Test and/or the Anderson-Darling Two Sample Test to the distributions. The latter test is sensitive to the tail distribution, and is effective for capturing rare events, most often catastrophic failures are rare when compared to normal operation.

In the second embodiment, degradation analyzer 510 may compare the time-series of radio resets (or other performance metrics) pre- and post-change and determine whether the changes in time series trends or seasonality differ. This can be done using any number of time-series change point detection approaches.

Degradation analyzer 510 may also compare post-change performance indicators of interest with existing networking gear already running the same configuration in the network (instead of the same performance indicators for that device prior to the change). If the post-change performance indicators are similar to other device running that configuration, such an indication may be reported to the user. It may help determine if the performance degradation is indeed due to the configuration change of the device itself.

Based on the output of the above, degradation analyzer 510 may determine whether there is a change in the performance of one or many of the performance indicators. If so, degradation analyzer 510 may then create a list of performance metrics that have degraded and attempt to determine the root cause of the degradation. For example, Table 1 depicts a potential output of the degradation detection by degradation analyzer 510 through analysis of the pre- and post-change event distributions. In Table 1 below, the p-value shows the confidence with which the pre- and post-distributions are different.

TABLE 1

| AP MAC | Radio Slot | P value |
| --- | --- | --- |
| aes:Zyky-FR1oYBhUIA5P6JcgQbLKJBElxpQoN6E7W_QH0 . . . | 1 | 0.002729 |
| aes:YgMMuqL6fStoyts888GlhGU8ZPtb1vejUuWL7JKfL9 . . . | 1 | 0.004744 |
| aes:8oeLrKl4Evmz9FGdvEnBvMxtqCO8oFi56vADMbnWOC . . . | 1 | 0.006884 |
| aes:n19EGtO9GD1dAdXgTrI4iOKp2Ubq9iShlhNIAE-dvH . . . | 1 | 0.006957 |

In particular, once degradation analyzer 510 has determined that performance has decreased after implementing a configuration change, degradation analyzer 510 may then attempt to discern whether the degradation was due to the configuration change itself or was instead a spurious correlation. Note that finding the actual cause (and separating it from the correlation) is a hard problem, especially in environments such as large networks. Finding causation in many situations usually involves running many random experiments, and then inferring if a particular treatment actually caused the change in performance. However, in real networks, it is hard to experiment in large scale operational networks. Hence, the techniques herein propose taking an approach of estimating the causal inference using the "observational" data, where the observational data, by definition, is gathered without injecting any external experimentation data into the network.

Degradation analyzer 510 may use any number of methodologies to determine the underlying cause of performance degradation after a configuration change is implemented. In one embodiment, degradation analyzer 510 may use what is referred to herein as a "matching method," which can be described using the above example of a sharp increase in the number of radio resets after deploying a new WLC software version. A simple approach to this would be to infer causality from the observing the distribution of the radio resets, as detailed above. However, this does not answer many contextual questions. More specifically, the radio resets might also be caused due to other factors such as high interference or a high number of client association that occurred after the configuration was changed, but had nothing to do with the configuration change, which has been found to be common in many wireless networks.

To infer the root cause of the radio resets in the above example, degradation analyzer 510 may build a feature vector for each AP in the network for two cases: (a) a pre-change feature vector which, in causation theory, is the control group and (b) a post-change feature vector which, in the causation theory, is called the treatment group. The features include the statistics, such as mean, median and deviance of interference, packet failures, number of clients associated for the given APs. Degradation analyzer 510 may fuse the above feature rows with AP attributes, such as model of the AP, frequency band in which the radio operates, etc. Degradation analyzer 510 may then build a set of features for each AP under control group and treatment group. The features selected will provide the context of the AP. For example, the features may describe the AP model and the band in which it operates, as well as the operating context of the AP, such as mean number of clients connected and average traffic. Table 2 below illustrates such features:

TABLE 2

| Feature | Explanation | Type | Example |
| --- | --- | --- | --- |
| model | The model of the AP | Categorical | AIR-CAP3702I-A-K9 |
| gHzBand | The frequency band in which the radio operates | Categorical | 5 GHz or 2.4 GHz |
| channelWidth | Channel width usually used by the AP | Categorical | 20, 40 or 80 |
| meanClientCount | Mean number of clients connected to the AP | Continuous | 10.5 |
| meanTxBytes | Mean number of bytes transmitted (downstream) | Continuous | 2345.5 |
| meanRxBytes | Mean number of bytes received upstream | Continuous | 100.3 |

Let the $c_i$ indicate the feature vector for the $i^{th}$ AP before the configuration change (control group), and $t_i$ indicate the feature vector of the $i^{th}$ AP after the configuration change (treatment group).

For each device (e.g., AP) that is tagged as experiencing performance degradation, degradation analyzer 510 may use the matching method to infer the causality. This method will create a similar feature set for the AP and pick the nearest counter-factual neighbor. For example, degradation analyzer 510 can pick the top AP which was having the largest performance degradation. Note that this AP is in the treatment group, since the change was applied and performance degradation was detected. For this AP, degradation analyzer 510 creates the feature set of its context and find the nearest counter-factual neighbor. The nearest counter-factual neighbor for this AP is the nearest neighbor in the control group (since the AP is in the treatment group which has applied the change).

Let $y\_c(i)$ be the average number of radio resets for the $i^{th}$ AP where the performance has degraded. Let $y\_t(n_i)$ be the average number of radio resets for the nearest neighbor of AP-i ($n_i$). Degradation analyzer 510 can then measure the Individualized Treatment Effect (ITE) for the $i^{th}$ AP as:

$$ITE(i)=y\_c(i)-y\_t(n_i).$$

If the metric ITE(i) is beyond a certain threshold (say, greater than 5 resets), degradation analyzer 510 may conclude that the configuration change has indeed induced the performance degradation. The threshold can be guided by the network expert (e.g. via the UI) or can also be learnt from examples in the past, either in the same network or in other deployed networks.

In another hybrid embodiment, degradation analyzer 510 may define a new metric: SameAP_Difference(i)=$y\_c(i)$–$y\_t(i)$, which measures the difference in the number of resets before and after. The effect of configuration change for an AP-I is decided after examining both ITE(i) and SameAP_Difference(i).

The above methodology describes how the effect of one configuration parameter (e.g., WLC software version) on performance can be computed. However, in reality, a configuration of network devices typically consists of multiple parameters. In some embodiments, degradation analyzer 510 can capture the cause of the performance change by using machine learning and data mining to isolate configuration parameters that are affect most of devices which have experienced performance degradation. For example, consider a configuration with two parameters (version, channelWidth). Assume that version can take two values: 8.3.104.61 or 8.4.1.242. Similarly, highChannelWidth can take three parameters: 20, 40 and 80. The network administrator has the ability to set any possible valid combination of for the above parameters.

Previously, root-cause analysis with a binary treatment (e.g., control and treatment groups) was discussed. For multiple configuration parameters, degradation analyzer 510 may use a similar set of root-cause analysis methodologies that can handle multiple treatments. Notably, in the above example, there can be various combinations of configuration changes. If the current configuration is c_current={version=8.3.104.61, channelWidth=80}, the possible configuration changes may be one of the following (i.e., multiple treatments):

{version=8.3.104.61, channelWidth=40}→Changing the channelWidth to 40

{version=8.3.104.61, channelWidth=20}→Changing the channelWidth to 20

{version=8.4.1.242, channelWidth=20}→Changing the version and channelWidth

{version=8.4.1.242, channelWidth=40}→Changing the version and channelWidth

{version=8.4.1.242, channelWidth=80}→Changing the version and channelWidth

The multiple-treatment root-cause approach would determine which option has positive or negative impact on performance.

In another embodiment, degradation analyzer 510 can use common traits to find the parameters that most likely influence the performance degradation. For example, degradation analyzer 510 can construct a feature set for each AP with configuration parameters as features (version, channelWidth). Degradation analyzer 510 can then label each row as positive or negative based on the performance degradation. For example, degradation analyzer 510 can measure the number of radio-resets for each configuration, and decide to label a row as positive if the number of radio-resets is greater than a certain value (or a certain percentile). Degradation analyzer 510 can then run the common trait algorithm to figure out which features are highly responsible for positive labels (performance degradation).

Note that degradation analyzer 510 can also be used to provide feedback to change impact predictor (CIP) 508, so as to improve the model(s) of CIP 508. For example, by assessing the performance impact of a particular software release on one network, a predictive model of CIP 508 can be updated to better predict the impact of that release on another network.

The framework of architecture 500 also allows service 302 to make recommendations to a network administrator via output and visualization interface 318, in further embodiments. As described above, CIP 508 is configured to create models that can predict if a particular device, such as an AP, will experience a decline in performance due to a configuration change. Accordingly, degradation analyzer 510 may periodically (say, every night) check to see whether there is enough new data after the configuration change to assess or re-assess the performance degradation. For example, the degradation analyzer 510 may decide to run a performance assessment for a configuration change if: (a) there is data for more than one week after the configuration change for at least n-number of network devices or (b) more than one week since previous performance assessment.

If degradation analyzer 510 decides to assess the performance, then it triggers the creation of machine learning models required for root-cause assessment on performance will be enhanced or degraded through a configuration change. One possible approach of creating the models to assess performance of configuration change is to use covariate adjustment models for the root-cause analysis. As noted, the decision to update an AP is a function of the context of the AP, as shown in Table 2. In such a case, degradation analyzer 510 may create two regression models (using XGB Regression) with the features shown in Table 2 above:

A model for the "control group," which predicts the number of radio resets if the AP was not upgraded (stays in the current version 8.3.101.61)

A model for the "treatment group," which predicts the number of resets if an AP is upgraded to the new version (8.4.1.242).

For each AP that needs to be upgraded, the administrator may specify via the UI the features of the AP, to control the group and treatment group regression models. The output of the models will provide the data about the predicted number of resets if the AP was upgraded or not. Based on the difference in the number of resets predicted, the administrator can choose to upgrade or skip the upgrade.

Figure 6A:
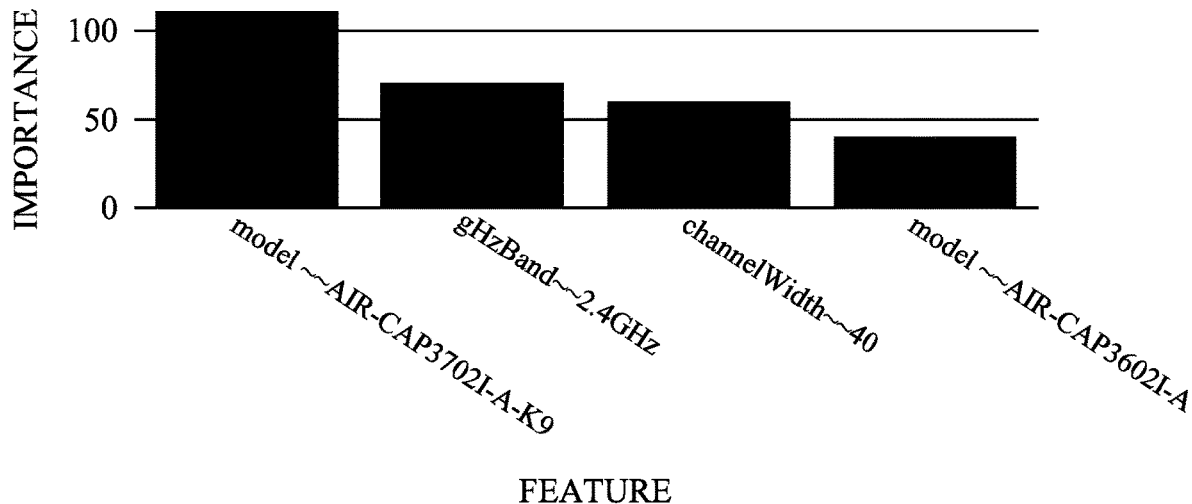
FIGS. 6A-6B illustrate examples of features by importance.
Figure 6B:
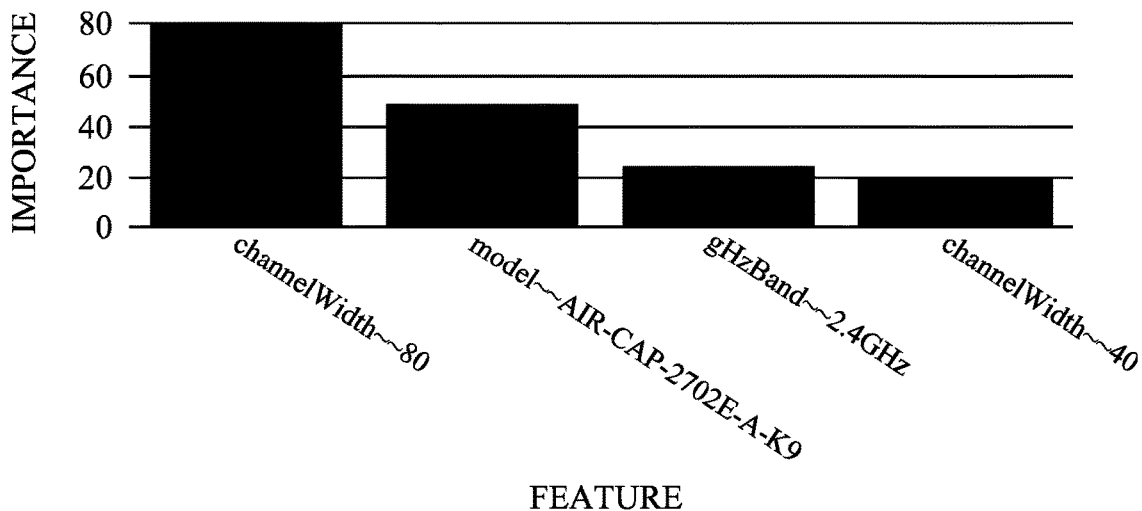

FIGS. 6A-6B illustrate examples of features by importance, according to various embodiments. Plots 600 and 610 shown highlight the important features in the control group (8.3.104.61) and the treatment group (8.4.1.242) that are being output from the trained regression models. The importance metric can then be computed for different features that are required to predict the number of resets. It can be seen that the feature of an AP using channelWidth=80 (or not using channelWidth=80) and a particular model is of very high importance.

In summary, components 506-510 of service 302 may create the necessary set of root-cause analysis models for each specific change in the configuration. This not only considers the performance degradation or enhancement, but also contains other contextual features (such as model of AP) that enable the network administrator to judiciously apply the change only when the data shows a positive (or non-negative) impact of the configuration change for a particular network device.

Reactive recommendations can also be made using architecture 500. For example, a user of the UI may ask service 302 whether a new change is advisable to be applied to a set of network devices, and the system will recommend with a positive or negative answer (with the confidence scores). In one embodiment, this can be triggered by the network administrator asking service 302 for a recommendation regarding a change configuration "c_new" for a particular network device (say, access point "AP-i"). In turn, service 302 may use CDE 506 to extract the current configuration c_current for the AP-i, giving both the current configuration and the new desired configuration (c_new). In turn, service 302 may search a database of CIP 508 to check if there is model for the change of configuration from c_current to c_new. If there is no such model, service 302 may recommend no result to the administrator. In another embodiment, it may search for the nearest configuration pair to (c_current and c_new) in CIP 508 and utilize those models to make a recommendation via the UI to the administrator, while indicating that a nearest match of configurations was performed instead of an exact match.

If a suitable model is found in CIP 508, then service 302 will assess the impact of the change from c_current to c_new. Service 302 may recommend the new configuration to the administrator, only if the impact of the c_new is expected to be beyond a certain improvement (or expected to not cause any degradations). For example, service 302 may recommend a version change only if the number radio resets do not increase beyond 1%.

More specifically, if a suitable model is found in CIP 508 for a potential configuration change, service 302 may create the features for the given device AP-i required by the model. For example, in the model description above, the features <model, gHzB and, channelWidth> can be generated for AP-i, which can then be passed to the root-cause model of degradation analyzer 510, which can output a recommendation to output and visualization interface 318 for presentation by the UI. For example, Table 3 below illustrates potential outputs that can be used to provide recommendations to the UI:

TABLE 3

| AP Model | gHzBand | Channel Width | numResets in 8.3.104.61 | numResets in 8.4.1.242 | Difference | Recommended? |
|---|---|---|---|---|---|---|
| A | 5 | 80 | 0.809824 | 1.079916 | 0.270091 | No |
| A | 2.4 | 20 | 0.166837 | 0.019286 | −0.147552 | Yes |
| A | 5 | 40 | 0.995687 | 0.000591 | −0.995096 | Yes |
| B | 5 | 80 | 0.001506 | | | |
| B | 2.4 | 20 | 0.001268 | | | |
| C | 2.4 | 20 | 0.001268 | | | |
| C | 5 | 40 | 0.000761 | | | |
| D | 2.4 | 20 | | 0.00186 | | |

Table 3 above summarizes potential output recommendation by service 302 to a network administrator for different types of APs. The first three columns specify the AP features. The fourth and fifth columns specify the number of resets that are predicted for an AP under control and treatment groups. The sixth column specifies the difference in number of resets observed if the AP was upgraded to the new version 8.4.1.242, and finally the last column shows the percentage improvement (or degradation, if negative), if the AP were to be upgraded to the new version 8.4.1.242. In one embodiment, the administrator may choose to upgrade if there is a positive effect on AP (percentage of improvement is positive), and decide against upgrade if the percentage of improvement is negative. If there is no data about percentage improvement because of such features not being present in the control or treatment group, then the administrator may choose to decide based on other external factors.

Table 3 above highlights the following recommendations that can be provided to the UI:

Do not upgrade the model A type of AP which operates on 5 GHz and channel width of 80, since it usually leads to a 33% degradation in performance.

Upgrade the APs with model A type and which operates on (2.4 GHz with channel width 20) or (5 GHz with channel width of 40), since it leads to decreases in the number of resets by 88% and 99%, respectively.

In some embodiments, architecture 500 may also provide proactive recommendations to the UI. In one embodiment, components 506-510 may operate in conjunction to analyze the models described above to extract the device clusters where a particular configuration change (e.g., a configuration c_current to c_new) will yield a positive impact on one or more performance indicators. One approach to perform this task is to first create all prominent "feature clusters" of APs can be created by examining the features of the models in regression. For example, Table 4 below shows the shows the 8 most prominent feature clusters when the versions changed from version 8.3.104.61 to 8.4.1.242:

TABLE 4

| Cluster ID | Model | gHzBand | Channel Width |
|---|---|---|---|
| 0 | A | 5 GHz | 80 |
| 1 | A | 2.4 GHz | 20 |
| 2 | A | 5 GHz | 40 |
| 3 | B | 5 GHz | 80 |
| 4 | B | 2.4 GHz | 20 |
| 5 | C | 2.4 GHz | 20 |
| 6 | C | 5 GHz | 40 |
| 7 | D | 2.4 GHz | 20 |

For each cluster, OP 508 will run the model and access the performance benefit, as shown in Table 3. It can then create two lists: positive feature list (list of AP features that result in positive impact), and negative list (AP features that result in negative impact). Service 302 can then go over the APs in the network deployments, possibly at different locations, and proactively recommend positive changes to APs which match similar features via the UI. It can also alert the administrators not to update the APs whose features belong to the negative list of features.

In some embodiments, service 302 may be configured to automatically apply a networking device configuration change, without first receiving an explicit instruction to do so via output and visualization interface 318. In one embodiment, the proactive recommendations above can be used to identify the set of devices and configuration changes that are predicted to result in a positive change to the performance indicator(s). Another approach may entail leveraging a specified set of whitelist or blacklist rules, to control such automatic configuration changes (e.g., a network administrator may allow automatic changes to the AP channel widths, but not the deployment of new software versions). An example of such rules may be:

White-listed rule: Apply new configuration for all devices where model=AIR* and channelWidth=80

Black-listed rule: Do not apply configuration for devices where meanClientCount in the past 1 week>3

Schedules can also be applied as rules, for purposes of making automatic configuration changes. For example, such a schedule-based rule may specify: apply configuration changes at midnight to all devices where (meanClientCount>3) OR apply configuration changes when meanTraffic in the past 6 hours <50 kbps.

Figure 7:
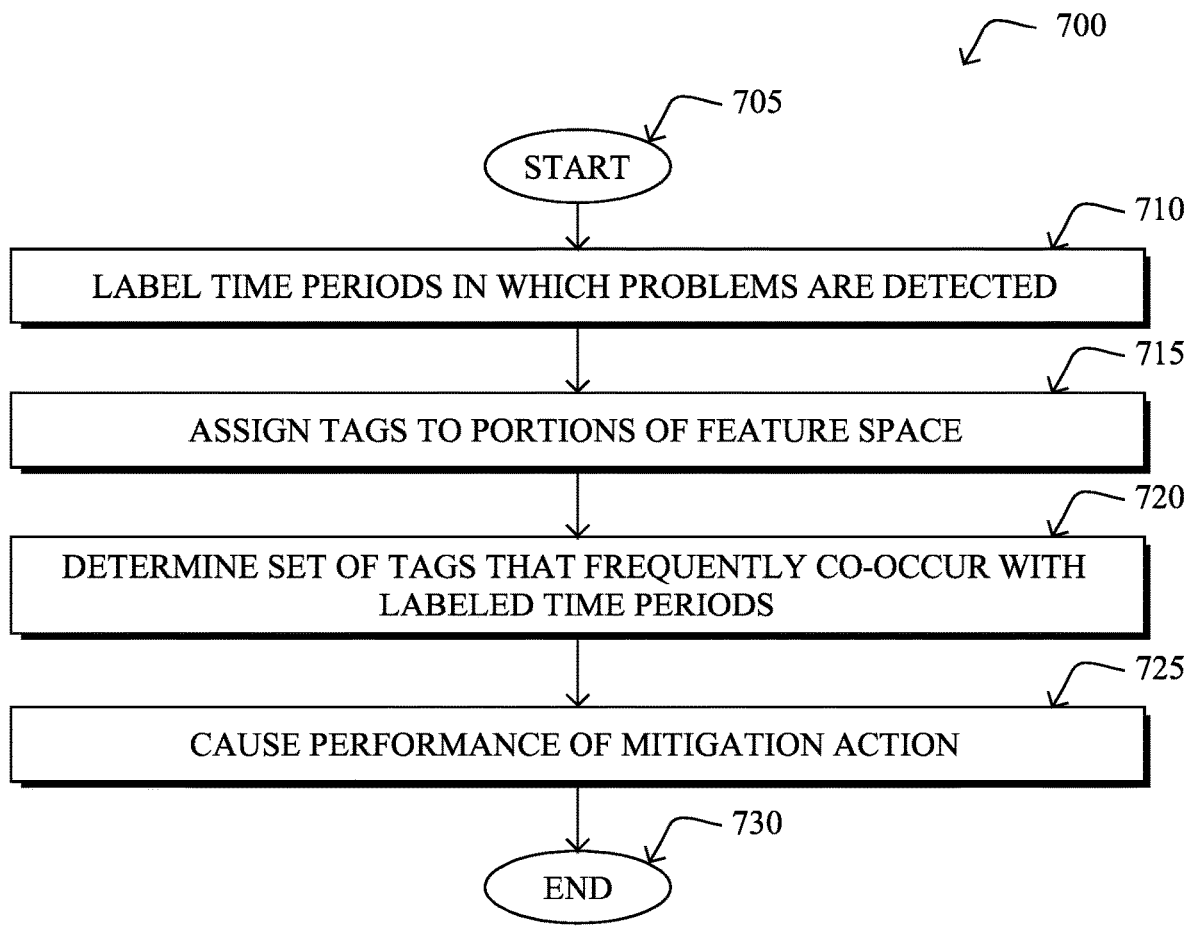
FIG. 7 illustrates an example simplified procedure for analyzing configuration changes in a network using machine learning.

FIG. 7 illustrates an example simplified procedure for analyzing configuration changes in a network using machine learning, in accordance with one or more embodiments described herein. For example, a non-generic, specifically configured device (e.g., device 200) may perform procedure 700 by executing stored instructions (e.g., process 248), to provide a network assurance service that monitors one or more networks. The procedure 700 may start at step 705, and continues to step 710, where, as described in greater detail above, the service may receive data indicative of networking device configuration changes in the one or more networks. Such changes may include software changes for a networking device (e.g., an AP, a controller for an AP, etc.) and/or a configuration parameter change (e.g., a wireless band, a wireless channel, etc.).

At step 715, as detailed above, the service may receive one or more performance indicators for the one or more networks. In various embodiments, the performance indicator(s) may include data regarding the number, frequency, and/or uniformity (e.g., presence of bursts) for throughput issues, on-boarding issues, radio reset, throughput per type of device, on-boarding times, interference, packet failure rates, or any other form of performance indicators for the monitored network.

At step 720, the service may train a machine learning model based on the received data indicative of the networking device configuration changes and on the received one or more performance indicators for the one or more networks. Such a model may comprise a statistical model or a regression model configured to predict an effect of a given configuration change on the performance indicator(s). For example, the model may compare conditional probability distributions between the two, for a current network state and a network state that would result from the proposed configuration change.

At step 725, as detailed above, the service may use the model from step 720 to predict a change in the one or more performance indicators that would result from a particular networking device configuration change. For example, the service may predict the effects of upgrading a controller for an AP from one software version to another on the number of radio resets.

At step 730, the service may cause the particular networking device configuration change to be made in the network based on the predicted one or more performance indicators. In some embodiments, the service may automatically deploy the particular configuration change to the networking device(s) in the network. In other embodiments, the service may provide data regarding the predictions to a user interface, thereby allowing a network administrator to make the final deployment decision. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for greater analysis and prediction of the effects of configuration changes on the performance of a network. In some aspects, the techniques herein can be used to make proactive recommendations and/or configuration changes, based on the predictions. In further aspects, the techniques herein can be used to assess any observed changes in the performance of the network after making a configuration change, to determine whether the change was the root cause. Such information can then be used to take mitigation actions (e.g., rolling back the configuration change) and/or update the prediction models.

While there have been shown and described illustrative embodiments that provide for analyzing configuration changes in a monitored network, it is to be understood that various other adaptations and modifications may be made within the spirit and scope of the embodiments herein. For example, while certain embodiments are described herein with respect to using certain models for purposes of predicting the effects of configuration changes on the network, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a network assurance service that monitors one or more networks, data indicative of networking device configuration changes in the one or more networks;
receiving, at the service, one or more performance indicators for the one or more networks;
training, by the service, a machine learning model based on the received data indicative of the networking device configuration changes and on the received one or more performance indicators for the one or more networks;
constructing, by the service, a pre-change distribution of the one or more performance indicators given a state of the one or more networks before a particular networking device configuration change has been made;
predicting, by the service and using the machine learning model, a change in the one or more performance indicators that would result from the particular networking device configuration change;
causing, by the service, the particular networking device configuration change to be made in the network based on the predicted one or more performance indicators;
constructing, by the service, a post-change distribution of the one or more performance indicators given the state of the one or more networks being updated to reflect the particular networking device configuration change being made; and
computing, by the service, a difference between the pre-change distribution of the one or more performance indicators and the post-change distribution of the one or more performance indicators to determine whether a performance degradation occurred due to the particular networking device configuration change.

2. The method as in claim 1, wherein the one or more performance indicators comprise a number of radio failures in the one or more networks.

3. The method as in claim 2, wherein the network device configuration changes comprise software changes made to wireless access points or to controllers for the wireless access points in the one or more networks.

4. The method as in claim 1, wherein the state of the one or more networks comprises a set of networking device configurations at a given point in time based on the data indicative of the networking device configuration changes.

5. The method as in claim 1, further comprising:
detecting, by the service and using the machine learning model, a change in the one or more performance indicators that resulted from making a networking device configuration change to the one or more networks.

6. The method as in claim 5, wherein the change is detected using a Kolmogorov-Smirnov test.

7. The method as in claim 1, wherein causing the particular networking device configuration change to be made in the network based on the predicted one or more performance indicators comprises:
providing, by the service, an indication of the predicted one or more performance indicators to a user interface.

8. The method as in claim 1, wherein the machine learning model comprises a regression model.

9. The method as in claim 1, wherein the particular networking device configuration comprises a frequency band setting or channel setting for a wireless access point.

10. An apparatus, comprising:
one or more network interfaces to communicate with one or more networks;
a processor coupled to the network interfaces and configured to execute one or more processes; and
a memory configured to store a process executable by the processor, the process when executed configured to:
receive data indicative of networking device configuration changes in the one or more networks;
receive one or more performance indicators for the one or more networks;
train a machine learning model based on the received data indicative of the networking device configuration changes and on the received one or more performance indicators for the one or more networks;
construct a pre-change distribution of the one or more performance indicators given a state of the one or more networks before a particular networking device configuration change has been made;
predict, using the machine learning model, a change in the one or more performance indicators that would result from the particular networking device configuration change;
cause the particular networking device configuration change to be made in the network based on the predicted one or more performance indicators;
construct a post-change distribution of the one or more performance indicators given the state of the one or more networks being updated to reflect the particular networking device configuration change being made; and
compute a difference between the pre-change distribution of the one or more performance indicators and the post-change distribution of the one or more performance indicators to determine whether a performance degradation occurred due to the particular networking device configuration change.

11. The apparatus as in claim 10, wherein the one or more performance indicators comprise a number of radio failures in the one or more networks.

12. The apparatus as in claim 11, wherein the network device configuration changes comprise software changes made to wireless access points or to controllers for the wireless access points in the one or more networks.

13. The apparatus as in claim 10, wherein the state of the one or more networks comprises a set of networking device configurations at a given point in time based on the data indicative of the networking device configuration changes.

14. The apparatus as in claim 10, wherein the process when executed is further configured to:
detect, using the machine learning model, a change in the one or more performance indicators that resulted from making a networking device configuration change to the one or more networks.

15. The apparatus as in claim 10, wherein the apparatus causes the particular networking device configuration change to be made in the network based on the predicted one or more performance indicators by:
providing an indication of the predicted one or more performance indicators to a user interface.

16. The apparatus as in claim 10, wherein the machine learning model comprises a regression model.

17. The apparatus as in claim 10, wherein the particular networking device configuration comprises a frequency band setting or channel setting for a wireless access point.

18. A tangible, non-transitory, computer-readable medium storing program instructions that cause a network assurance service that monitors one or more networks to execute a process comprising:
receiving, at the service, data indicative of networking device configuration changes in the one or more networks;
receiving, at the service, one or more performance indicators for the one or more networks;
training, by the service, a machine learning model based on the received data indicative of the networking device configuration changes and on the received one or more performance indicators for the one or more networks;
constructing, by the service, a pre-change distribution of the one or more performance indicators given a state of the one or more networks before a particular networking device configuration change has been made;
predicting, by the service and using the machine learning model, a change in the one or more performance indicators that would result from the particular networking device configuration change;
causing, by the service, the particular networking device configuration change to be made in the network based on the predicted one or more performance indicators;
constructing, by the service, a post-change distribution of the one or more performance indicators given the state of the one or more networks being updated to reflect the particular networking device configuration change being made; and
computing, by the service, a difference between the pre-change distribution of the one or more performance indicators and the post-change distribution of the one or more performance indicators to determine whether a performance degradation occurred due to the particular networking device configuration change.

\* \* \* \* \*